3,100,806
PROCESS FOR MAKING NITROCYCLOPROPANE

Paul G. Bay, Skokie, Ill., assignor to Abbott Laboratories, North Chicago, Ill., a corporation of Illinois
No Drawing. Filed June 4, 1962, Ser. No. 199,662
8 Claims. (Cl. 260—644)

The present invention is concerned with a new process for the preparation of nitrocyclopropane. More particularly, it is concerned with the ring closure of 1-halo-3-nitropropanes to yield nitrocyclopropane.

Nitrocyclopropane is an important building block in the preparation of cyclopropylamine which, in turn, is a valuable intermediate for the manufacture of a number of pharmaceutical products including tranquilizers, muscle relaxants, etc.

It is an object of the present invention to produce nitrocyclopropane from substituted aliphatic propanes. It is a further object to produce nitrocyclopropane from inexpensive starting materials. Another object of the present invention is the preparation of nitrocyclopropane at economical yields. Other objects will be apparent from the following disclosure and the appended claims.

These objects are accomplished by converting a major portion of 1-chloro-3-nitropropane into 1-iodo-3-nitropropane and subsequently converting the reaction mixture containing a major proportion of 1-iodo-3-nitropropane into nitrocyclopropane in the presence of an alkali metal hydroxide, carbonate or bicarbonate in water or a hydrocarbon solvent boiling above 80°. The ring-closure reaction is performed at elevated temperatures, preferably at a temperature between about 100° and 150° C.

In a simple embodiment, 1-chloro-3-nitropropane is refluxed with sodium iodide in acetone for several hours and the resulting mixture is distilled under reduced pressure to yield 1-iodo-3-nitropropane. The actual yield of 1-iodo-3-nitropropane obtained depends on the purity of the 1-chloro-3-nitropropane used as starting material and the refluxing period with sodium iodide. The reaction mixture containing this 1-iodo-3-nitropropane together with a minor proportion of unreacted 1-chloro-3-nitropropane is then stirred for several hours in water or a hydrocarbon solvent boiling above 80° C. in the presence of an alkali metal hydroxide, carbonate or bicarbonate. When water is the solvent of choice, the formed nitrocyclopropane can be recovered continuously by steam distillation from the reaction mixture or it may be extracted therefrom with an organic solvent such as ether.

The actual starting material for the process of the present invention is 1-iodo-3-nitropropane. It can be prepared from nitropropane by various methods of which the following appears very suitable: a mixture of 9.56 kg. (108.5 moles) of nitropropane and 40 grams of phosphorus pentoxide is stirred for 45 minutes while chlorine gas is bubbled through at a temperature of 26–33° C. to displace oxygen from the reaction flask. After replacing all oxygen in the reaction vessel, six sunlamps (General Electric's RS-type) are directed toward the reaction vessel and chlorine gas bubbling is continued. During the first hour, the temperature rises to 108° and thereafter remains at this temperature. The reaction is continued for 55 hours in which time 3.016 kg. of chlorine (85 moles) are used. The crude reaction mixture weighs 12.38 kg. and analyzes 35.7% (4.42 kg.) of 1-chloro-3-nitropropane, 22% of unreacted nitropropane, and 42.3% of other chlorinated nitropropanes such as 2-chloro-1-nitropropane, polychloronitropropanes, and 1-chloro-1-nitropropane. This mixture is stripped of unreacted nitropropane, and the lower boiling products such as 1-chloro-1-nitropropane are distilled off at 37–75 mm. of pressure and 75–90° C. The residue in the still is a mixture containing 65% 1-chloro-3-nitropropane.

Of the above 65% pure 1-chloro-3-nitropropane, 380 grams are added to a solution of 450 grams of sodium iodide in 2300 ml. of acetone. The mixture is stirred under reflux conditions for 18 hours, after which time acetone is removed by distillation, first at atmospheric pressure and later under reduced pressure. The residue is quenched in water. The bottom layer is separated, washed three times with water, and dried overnight over anhydrous magnesium sulfate. An analysis of this mixture shows it to contain 50.0% of 1-iodo-3-nitropropane and 15.2% of unreacted 1-chloro-3-nitropropane. Based on this analysis, 281 grams of this mixture represents 1 mole of 1-halo-3-nitropropane of which about 76% by weight (or 0.657 mole) is 1-iodo-3-nitropropane.

An alternate method of isolating crude 1-iodo-3-nitropropane consists in vacuum distillation of the reaction mixture. The desired fraction boils at 1 mm. pressure at 80–82° C. This fraction then contains about 70% 1-iodo-3-nitropropane and about 10% 1-chloro-3-nitropropane which, together with other chlorinated nitropropanes distills azeotropically with the main fraction.

It is to be understood that those skilled in the art will know of many variations and alternate methods of producing 1-iodo-3-nitropropane or mixtures of 1-halo-3-nitropropane containing a major proportion of 1-iodo-3-nitropropane admixed with 1-chloro-3-nitropropane or 1-bromo-3-nitropropane.

For better understanding, the actual process of the present invention is illustrated below by reference to specific examples which are not intended to limit the invention in any respect.

Example 1

To 40.5 grams of 1-halo-3-nitropropanes containing 0.145 mole of 1-iodo-3-nitropropane and 0.037 mole of 1-chloro-3-nitropropane at 115° C., a solution of 10 grams (1 mole equivalent) of sodium carbonate in 30 ml. of water is added within a period of about 25 minutes. The nitrocyclopropane formed is continuously removed by steam distillation. The distillate is extracted with ether and the ether solution is dried over anhydrous magnesium sulfate. After removal of the ether, the residue is analyzed, showing the presence of 33% of the theoretically calculated yield of nitrocyclopropane. Vacuum distillation of this residue produces 98% pure nitrocyclopropane boiling at 33° C. under 8 mm. pressure.

By replacing the above sodium carbonate with 22.7 grams (1.5 mole equivalents) of sodium bicarbonate, substantially the same yield of pure nitrocyclopropane is obtained under otherwise identical conditions.

When, in the above example, sodium carbonate is replaced with 12.6 grams (1.2 mole equivalents) of potassium hydroxide, substantially the same result is obtained.

Example 2

To a stirred mixture of 138.2 grams (2.3 mole equivalents) of anhydrous potassium carbonate in one liter of toluene stirred under reflux conditions, 230.7 grams of mixed 1-halo-3-nitropropane containing 0.52 mole of 1-iodo-3-nitropropane and 0.35 mole of 1-chloro-3-nitropropane is added dropwise within a period of 2 hours. After completion of the addition, the combined mixture is stirred for another 35 minutes under reflux. Subsequently the mixture is filtered and the filtrate is concentrated by distillation. Analysis of the residue shows the presence of 52% of the theoretical yield, based on the combined total weight of 1-chloro-3-nitropropane and 1-iodo-3-nitropropane. The product is isolated by vacuum distillation as in Example 1.

In a repetition of this example, potassium carbonate is replaced by 77 grams (1.2 mole equivalents) of anhydrous lithium carbonate. Substantially the same result is obtained at otherwise identical conditions.

In a further repetition of this example, a mixture of xylenes is used as the reaction medium in place of toluene, and again, the same result is obtained at otherwise identical conditions.

When, in the above example, potassium carbonate is replaced with 174 grams (2 mole equivalents) of anhydrous potassium bicarbonate, substantially the same result is obtained.

As will be seen from the foregoing examples, any alkali metal hydroxide, carbonate, or bicarbonate can be used for the ring closure reaction of the present invention. It will also be seen from the above examples that comparable results are obtained by using water or a relatively high-boiling organic solvent such as toluene, as the reaction medium. Other reaction media producing substantially the same results are p-xylene, o-xylene, m-xylene, or a mixture of xylene, benzene, tetrahydronaphthalene, decaline, heptane, the various isoheptanes such as 2-methylhexane or 3-methylhexane, 2,3-dimethylpentane, 3-ethylpentane, etc.

It will be clear to those skilled in the art that, when a solvent is chosen which boils below the desired reaction temperature, superatmospheric pressure may be employed.

The ring closure reaction with which the present invention is concerned can be carried out over a wide range of temperatures. However, in order to obtain a commercially attractive reaction rate, a reaction temperature between 100–150° C. is recommended.

The ring closure reaction of the present invention can be carried out in the above solvents with the aid of alkali metal hydroxides, carbonates or bicarbonates. The best-suited alkali metals are sodium, potassium and lithium. Thus, the reaction can be performed in the presence of sodium hydroxide, potassium bicarbonate, lithium carbonate, or similar basic alkaline salts or hydroxides. The reaction can be performed by adding the 1-halo-3-nitropropane mixture to a boiling solution or suspension of the above basic materials in water or a relatively high-boiling hydrocarbon solvent, or preferably it is performed in the reverse manner, i.e. adding a basic suspension or solution to the 1-halo-3-nitropropane. When water is used as the reaction medium, it is desirable to remove the formed nitrocyclopropane continuously by steam distillation.

It will be seen from the foregoing examples that the process of the present invention produces high yields of very pure nitrocyclopropane through an extremely simple reaction involving no special equipment and no purified starting material. It is, however, of extreme importance that the 1-halo-3-nitropropane used as starting material contains a major fraction of 1-iodo-3-nitropropane, since the corresponding chloro derivative of nitropropane submits to ring closure, under the best conditions, only with a 10% yield.

Where water is used as the reaction medium, it is advantageous to operate at high concentration. This may be achieved by using a highly concentrated aqueous solution of the salt or hydroxide used and/or by distilling off water during the reaction which latter method simultaneously serves the purpose of continuously separating the desired product. If, on the other hand, an organic solvent is used as reaction medium, the amount of solvent used is of little significance.

The amount of the basic, inorganic reagent used can be chosen in a wide range. Satisfactory results are obtained when this amount is between about 1.0 and about 2.5 mole equivalents based on the amount of combined 1-halo-3-nitropropane. It should be kept in mind that when an alkali metal hydroxide or bicarbonate is used, the ring-closure reaction requires 1 mole of this reagent per mole of 1-halo-3-nitropropane while, when an alkali metal carbonate is used, only ½ mole thereof is needed to satisfy the reaction equation. As seen above, a small excess of the inorganic material is permissible.

Others may practice the invention in any of the numerous ways which will be suggested by the present disclosure to one skilled in the art. All such practice of the invention is considered to be a part hereof provided it falls within the scope of the appended claims.

I claim:

1. The process of preparing nitrocyclopropane consisting essentially in
    reacting a 1-halo-3-nitropropane which comprises a major proportion of 1-iodo-3-nitropropane with an inorganic compound selected from the group consisting of alkali metal hydroxides, carbonates and bicarbonates at a temperature between 100° and 150° C. in a reaction medium selected from the group consisting of water and an inert hydrocarbon solvent boiling above 80° C.

2. The process of claim 1 wherein said 1-halo-3-nitropropane is substantially pure 1-iodo-3-nitropropane.

3. The process of claim 1 wherein said 1-halo-3-nitropropane comprises at least 50% 1-iodo-3-nitropropane with the remainder being 1-chloro-3-nitropropane.

4. The process of claim 1 wherein said 1-halo-3-nitropropane is prepared by refluxing 1-chloro-3-nitropropane with excess alkali metal iodide in acetone.

5. The process of claim 1 wherein said hydrocarbon solvent is toluene.

6. The process of claim 1 wherein said inorganic compound is used in an amount of between 1.0 and 2.5 moles per mole of 1-halo-3-nitropropane.

7. The process of claim 6 wherein said inorganic compound is potassium carbonate.

8. The process of claim 6 wherein said inorganic compound is sodium carbonate.

No references cited.